US012591988B2

(12) United States Patent
Khachlouf et al.

(10) Patent No.: US 12,591,988 B2
(45) Date of Patent: Mar. 31, 2026

(54) METHOD FOR CONSTRUCTING AN IMAGE FROM A VARIABLE FOCUS OPTICAL DEVICE

(71) Applicant: SQUAREMIND, Paris (FR)

(72) Inventors: Ali Khachlouf, Paris (FR); Tanguy Serrat, Saint-Cloud (FR)

(73) Assignee: SQUAREMIND, Paris (FR)

( * ) Notice: Subject to any disclaimer, the term of this patent is extended or adjusted under 35 U.S.C. 154(b) by 310 days.

(21) Appl. No.: 18/565,409

(22) PCT Filed: Jun. 1, 2022

(86) PCT No.: PCT/EP2022/064972
§ 371 (c)(1),
(2) Date: Nov. 29, 2023

(87) PCT Pub. No.: WO2022/253925
PCT Pub. Date: Dec. 8, 2022

(65) Prior Publication Data
US 2024/0265562 A1      Aug. 8, 2024

(30) Foreign Application Priority Data

Jun. 1, 2021      (FR) ...................................... 2105767
Jul. 27, 2021      (FR) ...................................... 2108163

(51) Int. Cl.
*G06T 7/571*          (2017.01)
*G06T 5/50*          (2006.01)
(Continued)

(52) U.S. Cl.
CPC ................ *G06T 7/571* (2017.01); *G06T 5/50* (2013.01); *G06T 5/60* (2024.01); *G06T 7/74* (2017.01);
(Continued)

(58) Field of Classification Search
CPC .. G06T 7/571; G06T 5/50; G06T 5/60; G06T 7/74; G06T 2207/10016;
(Continued)

(56) References Cited

U.S. PATENT DOCUMENTS

| | | |
|---|---|---|
| 5,793,900 A | 8/1998 | Nourbakhsh et al. |
| 6,532,036 B1 | 3/2003 | Peleg et al. |

(Continued)

OTHER PUBLICATIONS

Wlodek, J., K. J. Gofron, and Y. Q. Cai. "Achieving 3D imaging through focus stacking." AIP Conference Proceedings. vol. 2054. No. 1. AIP Publishing LLC, 2019. (Year: 2019).*

(Continued)

*Primary Examiner* — Utpal D Shah
(74) *Attorney, Agent, or Firm* — CUSHMAN PARTNERS

(57) ABSTRACT

A method for acquiring images of a first surface of a human body using a image capturing device including a variable focus optics, the method including acquisitions of a plurality of images using the image capturing device, the acquisitions being carried out by varying the focal length of the variable focus optics according to a control law; constructing a sharp image of a portion of the surface of the human body from the plurality of images acquired of the surface, and estimating the depth map of the local geometry of the first surface.

13 Claims, 2 Drawing Sheets

(51) Int. Cl.
    *G06T 5/60*         (2024.01)
    *G06T 7/73*         (2017.01)

(52) U.S. Cl.
    CPC ............... *G06T 2207/10016* (2013.01); *G06T 2207/10148* (2013.01); *G06T 2207/20081* (2013.01); *G06T 2207/20084* (2013.01); *G06T 2207/30004* (2013.01)

(58) Field of Classification Search
    CPC . G06T 2207/10148; G06T 2207/20081; G06T 2207/20084; G06T 2207/30004; G06T 2207/10028; G06T 2207/20021; G06T 2207/20221
    See application file for complete search history.

(56)            References Cited

U.S. PATENT DOCUMENTS

| | | | |
|---|---|---|---|
| 11,405,547 B2 * | 8/2022 | Park | H04N 23/67 |
| 2009/0066786 A1 * | 3/2009 | Landa | H04N 13/282 |
| | | | 348/E13.001 |
| 2018/0253877 A1 * | 9/2018 | Kozub | H04N 23/958 |
| 2019/0353886 A1 * | 11/2019 | Iliopoulos | G02B 21/26 |
| 2020/0142207 A1 * | 5/2020 | Chin | H04N 13/32 |
| 2022/0187509 A1 * | 6/2022 | Taveniku | H04N 23/676 |
| 2022/0383500 A1 * | 12/2022 | Galeotti | G06T 7/20 |

OTHER PUBLICATIONS

Clark, Douglas, and Brian Brown. "A rapid image acquisition method for focus stacking in microscopy." Microscopy Today 23.4 (2015): 18-25. (Year: 2015).*

Li, Haoxiang, et al. "A convolutional neural network cascade for face detection." Proceedings of the IEEE conference on computer vision and pattern recognition. 2015. (Year: 2015).*

International Search Report as issued in International Patent Application No. PCT/EP2022/064972, dated Oct. 10, 2022.

Zhao, X., et al., "3D visual sensing technique based on focal stack for snake robotic applications," Results in Physics, vol. 12, Mar. 2019, XP055893346, Retrieved from the Internet: URL:https://www.sciencedirect.com/science/article/pii/S2211379718321144/pdfft?md5=b166fb3390b6c0d3b0048d2f8864b67e&pid=1-s2.0-S2211379718321144-main.pdf>, pp. 1520-1528.

Choi, D., et al., "Improved Image Selection for Focus Stacking in Digital Photography," 2017 IEEE International Conference on Image Processing, Sep. 2017, XP033323078, pp. 2761-2765.

* cited by examiner

METHOD FOR CONSTRUCTING AN IMAGE FROM A VARIABLE FOCUS OPTICAL DEVICE

CROSS-REFERENCE TO RELATED APPLICATIONS

This application is the U.S. National Stage of PCT/EP2022/064972, filed Jun. 1, 2022, which in turn claims priority to French patent application number 2108163 filed Jul. 27, 2021 and French patent application number 2105767 filed Jun. 1, 2021. The content of these applications are incorporated herein by reference in their entireties.

FIELD OF THE INVENTION

The field of the invention relates to that of optical devices with a variable focus making it possible to acquire images of a body. In particular, the field of the invention relates to liquid lens optical devices making it possible to acquire high-resolution images of a human body and to make use of the same. The field of the invention especially finds application in guiding a robot arm at the end of which an optical device is configured to acquire images of an individual's skin.

STATE OF THE ART

Currently, to acquire sharp and good resolution images of a zone of a body desired to be analyzes, optics with a low depth of field are generally used. For example, in dermatological applications, image quality is essential for a posteriori analysis of the skin surface. Therefore, reduced field optics are favored for promoting definition of the colors and asperities of a skin surface.

However, these macrophotographic optics that have a relatively small depth of field imply that the sharp zone of the acquired image is also small. Nevertheless, this solution is incompatible with the acquisition of curved zones in which the depth of field used makes certain parts of the vicinity of a point blurred as they leave the sharpness zone. It is therefore necessary to make acquisitions in the vicinity of this point either by modifying shooting or by modifying the optics to extend the acquisition zone by a larger surface area. However, it is difficult to configure shooting settings without first knowing the body surface topology the images of which are desired to be acquired. This lack of knowledge makes operations complex and time-consuming. In addition, the different shooting configurations used are an obstacle to the rendering of a complete and sufficiently explicit portion of the surface.

Document CHOI DAVID et al. —"Improved image selection for focus stacking in digital photography"—2017 describing stack image shooting by a variable focus device to obtain a sharp image is also known. However, this type of device is not applicable to dermatological images due to the time required to acquire all necessary images.

The invention makes it possible to overcome these drawbacks.

SUMMARY OF THE INVENTION

According to a first aspect, the invention relates to a method for acquiring images of a first surface of a human body using an image capturing device comprising a variable focus optics, said method comprising the steps of:

acquisitions of a plurality of images using the image capturing device, said acquisitions being performed by varying the focal length of the variable focus optics according to a control law;

constructing a sharp image of a portion of the surface of the human body from the plurality of images acquired of said surface, estimating the depth map of the local geometry of the first surface.

One advantage is to make it possible to reconstruct a sharp image of a human body in order to enable, for example, categorization of dermatological units such as moles.

According to one embodiment, constructing an image of a portion of the body surface comprises:

clipping images of the plurality of images from a piece of estimated sharpness information to generate sharp zones and blurred zones;

assembling the sharp zones of said images to construct a sharp image of the surface of the body portion.

One advantage is to allow reconstruction of a complex surface of the human body by making the most of the optics and images acquired over the entire considered zone.

According to one embodiment, the method comprises measuring or estimating a distance between the variable focus optics and a first point on the body surface, the control law taking account of said distance measured or estimated between the variable focus optics and the first point to modify the focal length of the optics between at least two images acquired in the vicinity of the point on the body surface.

One advantage is to increase performance of the control law by reducing the range of values of the focal distance variation. In addition, measuring the distance also allows a better estimation of image sharpness.

According to one embodiment, measuring or estimating the distance between the variable focus optics and a first point of the body surface is performed:

by measuring distance per point and/or;

by measuring distance combined with a known piece of topological information of the body model of the body surface and/or;

by a known piece of topological information of the body model of the body surface and a piece of position information of the optics with respect to the 3D model and/or;

by measuring distance combined with measuring local geometry of the imaged zone of the body surface and/or, by measuring local geometry of the imaged zone of the body surface and a piece of position information of the optics with respect to the 3D model.

One advantage is to obtain a better estimation by combining different estimations or measurements of the distance between the variable focus optics and a first point on the body surface in order to increase performance and/or quality of the result.

According to one embodiment, measuring, calculating or estimating the distance between the variable focus optics and a first point of the body surface is carried out either by measuring or by estimating:

using a distance measuring means;

from a piece of sharpness information of all images acquired and an algorithm for estimating blur and/or sharpness.

According to one embodiment, the method comprises the steps of:

Receiving a 3D model of at least one part of a body, said 3D model modeling at least one first surface of said body;

Retrieving local topological data of the vicinity of at least the first point, said local topological data being extracted from the 3D model or calculated from the 3D model;

The acquisitions of a plurality of images being performed by varying the focal length of the variable focus optics according to a control law further taking account of the local topological data of the vicinity of the first point of the first surface.

One advantage is to know a piece of topological information of the body which, on the one hand, makes it possible to optimize control law in terms of calculation and time, and, on the other hand, to guide a mobile device effectively if necessary.

According to one embodiment, the first surface of the 3D model is a surface of a human body.

According to one embodiment, the first surface of the 3D model is a point cloud, especially a spatially oriented connected graph.

One advantage is to have easily exploitable metrics to address and superimpose the reconstructed sharp 3D images on the body. Another advantage is that it is easy to plan guiding trajectories on the body surface. Another advantage is to make it possible to know the local depths of field of a region of the surface accurately to pilot the control law of the focal length of the optics.

According to one embodiment, the method comprises the steps of:

Generating a treatment trajectory on the surface of the 3D model using a calculator, said treatment trajectory comprising at least two points on the surface of the 3D model, Constructing an image of a portion of the body surface in the vicinity of the treatment trajectory.

One advantage is to automatically generate a complete image of a human body by programming in advance a mobile device such as a robot arm.

According to one embodiment, the range of values of the focal length of the variable focus optics is defined according to the local topological data of the 3D model in the vicinity of the first point of the processing trajectory.

According to one embodiment, the acquired images are processed so as to generate gradient sharpness information between the pixels of a same image, said gradients being used so as to generate alignment instructions between the successive acquired images, said images realigned to produce a set of image portions covering the same pixel zones, the information of sharpness or blur or of these portions being compared to select the sharpest pixels, said selected pixels being merged to construct a composite 2D or 3D image.

One advantage is to obtain a sharpness map of each image in order to collect and select the set of sharpest pixels of an image.

According to one embodiment, constructing the image of a portion of the body surface comprising clipping and assembling the images is performed from a learning algorithm, of the neural network type, trained so as to produce a 3D sharp output image from a plurality of images acquired at input.

One advantage is to generate sharp images quickly by means of an artificial intelligence algorithm.

According to one embodiment, the image processing algorithm estimating sharpness or blur of each point of the images of the plurality of images is implemented by a first learning function, for example a machine learning method.

According to one embodiment, the image processing algorithm comprises selecting and clipping each group of pixels of each image having a sharpness greater than a predefined threshold or a sharpness greater than the sharpness of pixels of at least one other image of the same zone.

According to one embodiment, the method comprises a step of estimating value of the distance between the variable focus optics and at least one first point of the processing trajectory from an estimation of the sharpness of points of the images of the plurality of images, said estimation being made from an image processing algorithm.

One advantage is to allow generating a depth map by software means not requiring additional equipment. When equipment allowing to generate a depth map is used, the estimation step performed by a software means allows, for example, measurement of a device to be refined.

According to one embodiment, the method comprises estimating the relative depth between the pixels of a same image and calibrating the measurement of at least one pixel to generate a piece of absolute depth information of at least one pixel.

According to one embodiment, the variable focus optics is arranged on a guide element configured to move a lens.

According to one embodiment, the method comprises, between the steps of generating a treatment trajectory and measuring the distance, the steps of:

Calculating a trajectory of guiding the variable focus optics,

Generating a kinematics of the guide element so that a point of the variable focus optics is feedback controlled to the guiding trajectory;

Activating kinematics of the guide element to travel the guiding trajectory, said guiding trajectory being calculated in real time from the 3D surface model.

According to one embodiment, the method comprises a step of correcting the guiding trajectory from the real-time reconstruction of the 3D model.

According to another aspect, the invention relates to an image capturing device characterized in that it comprises a variable focus optics to acquire a plurality of images of the surface of an individual's body using the image capturing device, said acquisitions being carried out by varying the focal length of the variable focus optics according to a control law, said device comprising at least one calculator configured to implement an image processing algorithm to generate a sharp 3D image.

According to one embodiment, the image capturing device comprises means for measuring a distance between the variable focus optics and a first point on the body surface, said acquisitions being carried out by varying the focal length of the variable focus optics according to a control law taking account of the distance between the variable focus optics and the first point.

According to one embodiment, the image capturing device further comprises an interface for receiving a 3D model of at least one part of a human body, said model modeling at least one first surface of the body and a mobile platform, said calculator(s) being configured to:

Retrieve local topological data of the vicinity of at least the first point, said local topological data being extracted from the 3D model or calculated from the 3D model;

Control acquisition of a plurality of images by the image capturing device, said acquisitions being carried out by varying the focal length of the variable focus optics according to a control law taking account of the distance between the variable focus optics and the first point, and local topological data of the vicinity of the first point of the first surface.

According to one embodiment, the image capturing device comprises a device for measuring distance between the variable focus optics and the first point configured to measure in real time a distance between the variable focus optics and a first point on the body surface, and a means for measuring orientation of the optics to deduce a piece of angle of view information, said orientation and distance being used by a calculator of the device to correct or transform the image acquired.

According to one embodiment, the image capturing device comprises a guide element including the variable focus optics, the calculator(s) being configured to:

Generate a treatment trajectory on the surface of the 3D model, said treatment trajectory comprising at least two points on the surface of the 3D model;

Calculate a guiding trajectory of the variable focus optics;

Generate a kinematics of the guide element so that a point of the variable focus optics is feedback controlled to the guiding trajectory;

Activate a kinematics of the guide element to travel the guiding trajectory, said guiding trajectory being calculated in real time from the 3D surface model.

According to one embodiment, the variable focus optics is a liquid lens.

According to another aspect, the invention relates to a mobile platform comprising an image capturing device of the invention, said platform comprising a control interface to receive guidance instructions calculated in particular from the body model calculated in real time.

According to one embodiment, the mobile platform is:

a robot arm including a plurality of degrees of freedom;

a drone including an optics forming an image capturing device;

a guide rail on which the image capturing device is movable or:

a cabin for accommodating a human subject comprising means for guiding an image capturing device, a platform comprising a fixed part accommodating the image capturing device and a moving part driving an individual moving relative to the fixed part.

According to one aspect, the invention relates to a gun-type device comprising a tip holding the image capturing device according to the invention.

BRIEF DESCRIPTION OF THE FIGURES

Further characteristics and advantages of the invention will become clearer upon reading the following detailed description, with reference to the appended figures, that illustrate.

DETAILED DESCRIPTION

Figures 1, 2:
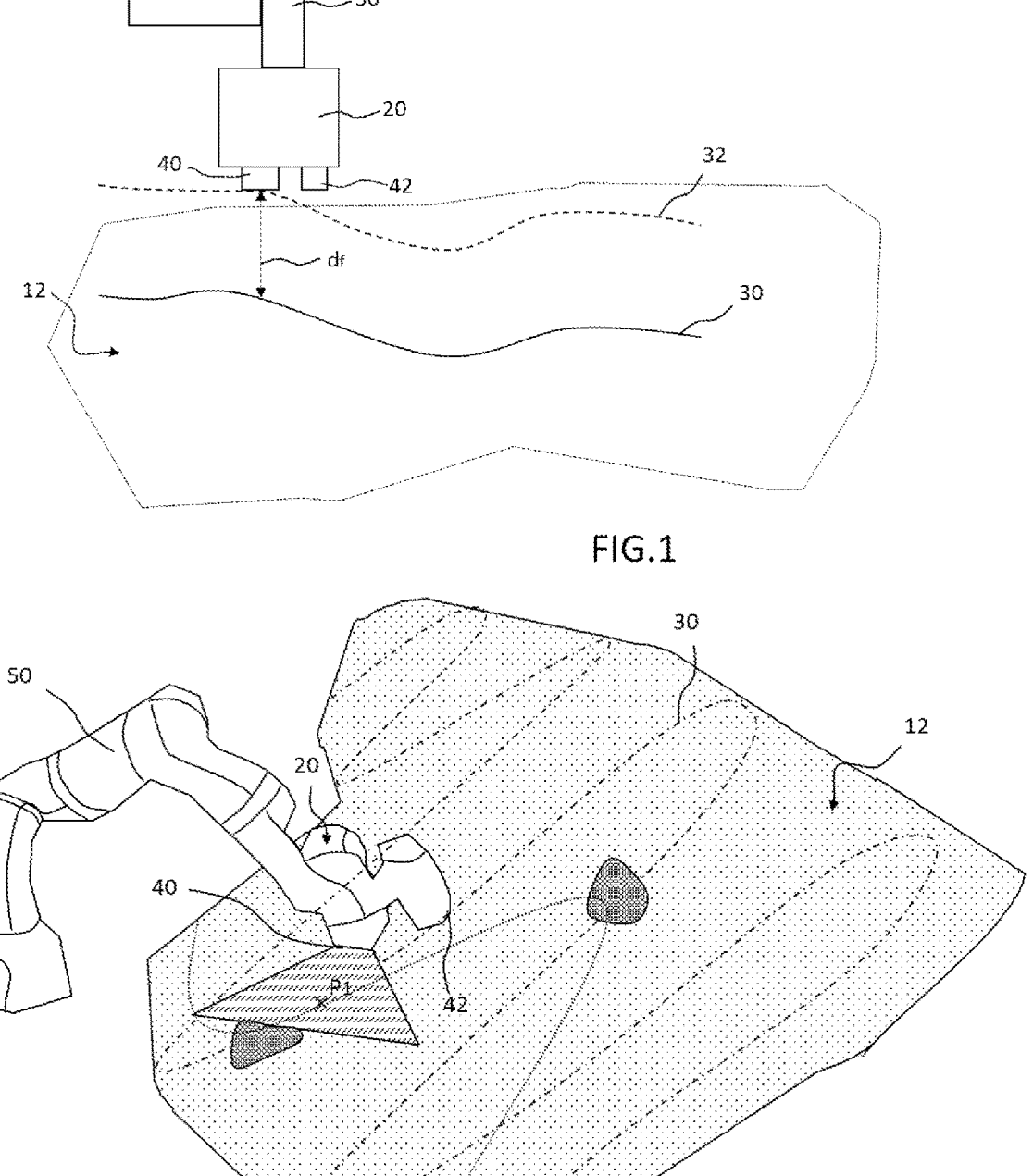
FIG. 1: an example of guide device configured to acquire images of the surface of a body and to reconstruct a sharp image of at least a portion of the body surface.
FIG. 2: an example of image capturing device of the invention guided along a guiding trajectory to acquire images in the vicinity of a trajectory on the surface of a body.
Figures 3, 4:
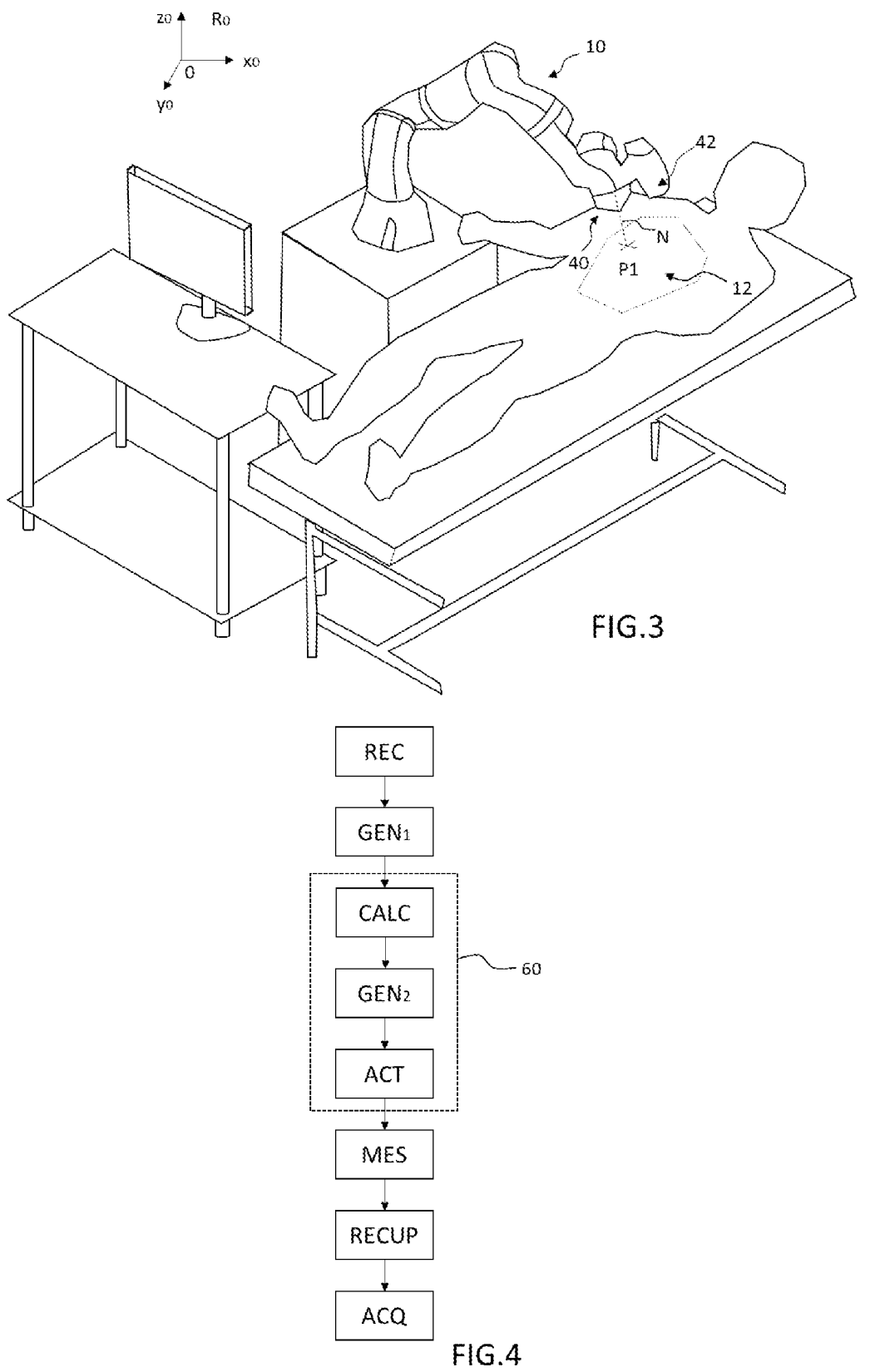
FIG. 3: an example of guide device configured to acquire images of the surface of a human body such as a patient.
FIG. 4: an example of a flowchart representing the steps of the method for acquiring images for processing them in order to reconstruct a sharp image of all or part of a body surface.

FIG. 1 illustrates an image acquisition device 20 of the invention including a variable focus optics 40. An image acquisition device 20, also referred to as an image capturing device is configured to acquire a plurality of images in the vicinity of at least one point located on the surface of a body. The invention especially finds application in dermatology and image analysis of an individual's skin. However, the invention is not limited to this application and can be implemented in other fields. Finally, the invention is particularly advantageous when image acquisition devices 20 comprise optics adapted to macrophotography, or even microphotography, such as optics with a large aperture.

One purpose of the invention is to reconstruct the photograph of the surface of a body so that each portion of the three-dimensional image reconstructed is as sharp as possible.

In the remainder of the description, "body" means the body of a human. However, the invention is not limited to this embodiment, the invention can be implemented for any type of body having a three-dimensional surface whose representation is sought to represent as faithfully as possible at least one portion.

The acquisition parameters, including the number of images, dimensions of the images, and resolution of the images can be predefined or defined according to a configuration of moving the acquisition device 20, for example when the same is arranged on a mobile platform moving around the body.

The invention advantageously makes it possible to acquire a set of images in the vicinity of a point by varying the focal distance of the acquisition optics according to a control law taking account of the distance between the variable focus optics and the target point.

The operation can thus be repeated on a plurality of points of a surface of a body in order to acquire several sequences each comprising a plurality of images in the vicinity of a plurality of points. This method may be performed continuously on a set of points of a surface to travel all or part of the surface of a body, or this method may be performed along a trajectory to the surface of the body in order to acquire images in the vicinity of points defining the trajectory. Thus, the entire surface of a body can be treated step by step.

In one embodiment, the expression "image in the vicinity of a point" should be understood as an image of a body surface including said point.

Variable Focus Optics

According to one embodiment, the variable focus optics 40 is advantageously a variable focus lens, also known as an adaptive lens. According to one embodiment, the lens used is a lens deformable by piezoelectric actuation. According to another embodiment, the lens is a liquid crystal lens. These use a change in the optical index of liquid crystals in order to modify the focal length of the lens. Finally, another embodiment may be implemented from a liquid lens whose geometry is controllable by micro-fluidic parameters or mechanical parameters such as parameters defining the geometry of a liquid-retaining membrane or a combination of both. According to one example, a liquid lens comprises a circular electroactive polymer membrane. The central part of the membrane forms the lens and the peripheral part has an annular electrode thereabove. By applying an electrical voltage between this electrode and the substrate, an electrostatic pressure is created, which tends to move the fluid toward the central part, swelling the membrane, and modifying the curvature of the lens. These devices can be controlled with a pilot voltage.

These parameters can be set, configured or piloted from a digital instruction from a sensor or a calculator or any other electronic device.

According to another embodiment, the variable focus optics includes a magnetic actuator enabling an optical element, such as a lens, to be moved to modify the focus. According to one example, the optical element moves, for example, in a tube, the position in the tube defining a focal distance specific to an optical configuration of the lens. The magnetic actuator can be controlled by an electromagnetic field generated from a dedicated component. The field can be adjusted, configured or piloted from a digital pilot instruction. This digital instruction can be generated by a control law from a calculator or sensor or any other electronic equipment.

According to another embodiment, the variable focus optics includes a mechanical actuator for moving an optical element, such as a lens, to modify the focus. The actuator can be controlled by an electronic component for receiving a digital instruction and generate a mechanical instruction. In this case, this digital instruction can also be generated by a control instruction from a control unit or sensor or any other electronic equipment.

One advantage of using variable focus optics is to dispense with defects of macrophotography that acquires images with a relatively low depth of field that remains incompatible with acquiring images in a curved surface portion, for example on the calf or arm. Another advantage is to have very short response times, for example a response time of less than 25 ms.

Accordingly, the use of a variable focus optics, for example in addition to an optics with a larger aperture, makes it possible to acquire sufficient accuracy of the images of a surface of a body in order to reconstitute a sharp overall image by an image reconstruction algorithm.

In order to guide shooting automatically to the vicinity of a point of sight, the invention makes it possible to automatically vary the focal length of an optics according to a control law in order to reconstitute a sharp image of the vicinity of the target point.

Case of the Liquid Lens

In the case of a liquid lens, the controller pilots the numerical value of the lens focus. In this example, the numerical value makes it possible to vary the lens shape.

According to one embodiment, controlling the liquid lens is performed by means of a continuous signal such as a trigonometric function, for example a sine function or a linear function, for example a function having a sawtooth shape. Such control will optimize stabilization of the medium making up the liquid lens. Such a control signal minimizes non-linear effects and reduces relaxation times or transient phases of modifying the medium of the liquid lens. Such a variation in the focus of the lens is also consistent with the course of the curvature of the zone in the vicinity of the target point $P_1$. Indeed, there is no assumed discontinuity, except for artifact effect or body surface edge effects, so a control law for the focus can be regular and continuous so as to match variations in surface topologies with variations in the lens focus.

According to one example, image acquisition by the liquid lens 20 is performed according to a predefined sampling over the entire range of focuses addressable by the lens. In this embodiment, the number of images acquired is constant at a speed of movement of the image capturing device. One advantage of this solution is to collect as many images as possible in order to achieve image stratification according to the different focuses of the lens. One advantage of this solution is to obtain a regular map of depth of the set of pixel-defining points of the image acquired.

Image

According to one embodiment, the image acquired is a color image in the visible spectrum. In this case, the frequency range of the acquired image can be the visible one, that is for wavelengths between 380 nm and 700 nm.

Depending on the modes where ranges extend on either side of the visible spectrum, it is possible to acquire images in a wider spectrum from dedicated equipment. According to one example, the images acquired are in an infrared range, that is for wavelengths between 700 nm and 1000 nm. According to another example, the images acquired are in the ultraviolet range, that is for wavelengths between 10 nm and 380 nm.

According to one embodiment, the image is a multispectral image. In the latter case, spectral imaging equipment may be used. A configuration of such equipment with a pilotable variable focus may be used within the scope of the invention. The equipment used for acquisition can be configured to acquire images whose spectrum is especially distributed over several frequency bands spaced part from each other. One interest is to obtain an image over a wider frequency band including, for example, infrared, near infrared and ultraviolet.

According to another example that can be combined with the previous modes, the image acquired is a hyperspectral image. In the latter case, an imaging spectrometer, also called an imager spectrometer or an imager associated with a spectrometer, allow a hypespectral image to be generated. The equipment used for acquisition can be configured to acquire images whose spectrum is especially distributed over several contiguous frequency bands. The equipment used can be configured with a pilotable variable focus. One advantage is to obtain an image over a wider frequency band with a high degree of resolution including, for example, infrared, near infrared and ultraviolet.

According to one embodiment, the equipment is a chemical imager or a chemical imaging device configured to create an image from an acquired frequency spectrum such as a spectrometer and space and time information.

Distance Measuring Means

According to one embodiment, the image capturing device 20 includes a means for measuring distance between the variable focus optical device 40 and a first point $P_1$ of the body surface.

This distance measuring means may be an active physical device such as an emitted laser disposed in proximity to the variable focus optics 40. The emission of the laser beam is used to measure the distance to the center of the acquired image. Other devices for measuring the distance between a point on the body surface and the variable focus optics 20 may be used, for example, a radio rangefinder, an optical rangefinder or even an acoustic rangefinder. Other examples of distance measuring devices may be used within the scope of the invention, such as a Lidar, a Radar, a Sonar or even a stadiametric rangefinder.

In order to perform distance measurement, the invention may implement a single-point measurement device such as a laser or a multi-point measurement system such as a laser, a so-called "time-of-flight matrix" device, a lidar, an active/passive stereoscopic device, or even a device including projection of a structured light.

According to one alternative, or according to one complementary mode, the means for measuring distance between the variable focus optics 40 and a first point $P_1$ of the body surface is a software means implementing a calculator processing the images acquired to extract a piece of sharpness or blur information from them to reconstruct from this piece of data information characterizing the distance between a point $P_1$ of the surface and the optics. One exemplary embodiment may be an algorithm detecting the sharpest pixel(s) of an image to deduce information about the distance between a point $P_1$ of the surface and the optics while also knowing the focus of the optics used. Gradients between the sharpest pixels and the other pixels can also be used in order to consolidate distance measurement between a point $P_1$ of the surface and the optics. The piece of focal distance information is then used to process evaluation of the distance between the variable focus optics and a point $P_1$ of the body surface. The set of sharpness or blur nuances between the pixels can then be used to consolidate calculation of the distance between a point $P_1$ of the surface and the optics or to define a local depth map in the vicinity of the point of sight $P_1$ or a point with the sharpness considered the highest.

According to one embodiment, an algorithm may be implemented by a learning function, of the type function trained by machine learning, such as a deep learning algorithm. In this embodiment, a CNN type convolutional neural network may be used. The learning function makes it possible, among other things, to detect the pixel(s) assumed to be the sharpest in the image and to determine a distance between a point $P_1$ of the surface and the optics.

For this purpose, a sharpness map, also called "defocus map", can be established for each of the images in the image stack by varying focus of the optics. Such a sharpness map makes it possible to encode a piece of blur or sharpness information, for example, on a standardized scale from 0 to 1.

When a conventional method is implemented, the sharpness map of a zone is constructed by considering the sharpest pixels of each image.

Methods for Measuring Distance from Acquired Images

According to one exemplary embodiment, the distance measured by a sensor may be combined with another distance measurement obtained either by another sensor or by another method for evaluating the distance.

Among the other methods, a first method consists in evaluating distance between the variable focus optics 40 and a point $P_1$ of the body surface from the acquired images and by an algorithm for estimating sharpness of different points of the image in order to reconstruct a piece of distance information between at least one point of the surface and the optics. Indeed, in this method, differences in sharpness of different points of different images that have been acquired with different focal distances allow an estimation of the distance of each of these points from the optics to be obtained. This estimation may or may not be combined with another method or piece of data from a sensor. This estimation can be used to define an input of a control law Lc of the focal distance of the optics 40.

Among the methods, one of them may be implemented if a priori knowledge of the volume or surface area 12 of the body is known. According to one embodiment, the invention comprises a component for generating a body model, in particular the three-dimensional surface of this body. This surface can be a surface defined in space or it can be defined by a point cloud or mesh. The point cloud can advantageously be connected and oriented in space, this is called spatial orientation in space. When the point cloud is oriented, it is possible to locate the surface of the body model in space, for example within a predetermined reference frame $R_0$. When the body model is located in a reference frame $R_0$ and the image acquisition device is also located, then it is possible to calculate a distance between a point $P_1$ of the body surface 12 and the variable focus optics 40 and use this distance to implement a control law Lc automatically piloting the focal distance df of the variable focus device 20.

From the following data: the position and orientation of the body in 3D in $R_0$, the knowledge of the body model and the position of the optical device in $R_0$, it is possible to calculate in real time a control law of the optics as a function of the relative position thereof with respect to the body.

According to a first case, this control law can be calculated in real time without having to plan an optical trajectory beforehand. This embodiment is particularly interesting in the case of an optics embedded in a mobile device of the gun type, that is removable according to the movements of an operator's hand, for example.

According to a second case, this control law can be calculated, for example, by planning a prior trajectory of the optics. This embodiment is particularly interesting in the case of an optics embedded in a robotic device such as an articulated robot arm and, more generally, a device embedded in any removable platform.

Use of a Body Model

When the invention implements automatic generation of an individual's body model, the latter may be generated from an optical device capturing partial or complete views of the individual's body. Partial views can then be used to generate a body model, for example, from an algorithm implemented by a learning function, such as a function that has been trained by machine learning. One example is a convolutional neural network. Such a function allows real-time generation of 3D body models of an individual from acquired partial views. Such a possibility makes it possible to calculate topological data in the vicinity of a target point $P_1$ of the body surface when scanning a trajectory by the image capturing device 20.

Topological Descriptor

Topology knowledge may come from different devices or methods for calculating at least one local topological descriptor at the target point $P_1$.

According to a first embodiment, the descriptor comes from a calculation performed in real time from an acquired image. This calculation may be performed with a second optical device configured with an aperture, depth of field or focal distance allowing local analysis of the depth map in the vicinity of the point $P_1$. According to the same example, the second optical device may comprise an infrared range optics. According to another example of a descriptor calculated in real time, a device comprising an image projection of which the deformation is calculated enables a depth map to be calculated. Another example is the use of structured light.

According to a second embodiment, the descriptor comes from a real-time calculation from an image extracted from a surface model of the human body that is oriented and positioned in space. Such a body model can, for example, be generated in real time from partial or total knowledge of a patient's body. A priori knowledge of the trajectory that was planned and the body model of the patient local images of the skin of which are desired to be obtained and finally knowledge of the image capturing device 20 and its arrangement with respect to the body make it possible to generate a set of a priori local descriptors before the image acquisition process in the vicinity of the target points $P_1$. Such a technique makes it possible to configure the control law Lc of the variable focus optics without depending on a real-time restriction. In addition, this technique saves real-time calculation time and allows optimizing the best image ratio necessary for the reconstruction of a sharp image of all or part of the human body a sharp image of which is desired to be obtained.

According to one embodiment, at least one local shape descriptor and/or one overall shape descriptor is (are) calculated. A descriptor can be of the type: "Wave Kernel Signature" (WKS) or "Heat Kernel Signature" (HKS) or "Gaussian Curvature". By way of example, the HKS descriptor is especially based on a solution of the heat equation, it is based on the Laplace-Beltrami operator. One advantage is to define shape descriptors from a spectral analysis of the region in the vicinity of a point. One advantage is the simplified use of standardized equations or operators whose digital processing can be optimized.

According to an example, calculating the vector normal to the surface at the target point $P_1$ also allows a local shape descriptor to be defined.

According to another example, the control law is calculated in real time on the body such that the focus of the optics sweeps the entire depth range of the mesh points of a local zone considered, that is between the furthest points of the optics and the nearest points of the optics. Thus, a priori knowledge of the local topology due to knowledge of the body model allows the control law to be piloted optimally according to the zone inspected. In other words, from the point cloud of a local zone of the body model, the invention makes it possible to extract a range of focus values enabling the control law of the optics to be controlled.

When at least one shape descriptor is calculated, the value thereof allows generating a range of focus values and defining an shooting sampling of the variable focus optics within this range. This sampling can be predefined or calculated in real time depending on the case.

According to an example when several shape descriptors are calculated locally, a shape coefficient is calculated in order to establish a simple rule of correspondence between the shape coefficient and a range of variation of the focus.
Generation of a Trajectory According to one example, the invention comprises guiding an image capturing device 20 along a trajectory or surface to be traveled on the surface of an individual's body. The method therefore makes it possible to process a plurality of target points $P_1$ along a trajectory. The trajectory may be initially planned on the surface of a calculated body model of an individual and then this trajectory may be recalculated or deformed upon guiding the image capturing device 20 as a function of the individual's displacements or movements. In this case, the position in space of at least one point of the surface can be recalculated in order to feedback control the trajectory of movement of the image capturing device.

In this example, topological descriptors can be recalculated at points of the feedback controlled trajectory, for example if the movement involves deformation of the body surface. In another case, the values of the descriptors as a first approximation may be retained at the points located on the trajectory having changed position.

According to one example, a shape detection algorithm may be implemented. This algorithm can be implemented, for example, to recognize postures such as {sitting, standing, arms raised, etc.} or even typical movements. According to one alternative, an operator may initiate a change in shooting modes that requires recalculation of the model and the position in space of the body.

In this example, the optical device is moved in a plurality of points forming a trajectory of the optical device. The optical device can be moved along a predefined trajectory in an automated way, for example by a robotic arm.

In another example, the optical device is directly guided by a user. In this case, the optical device may comprise a handle for being gripped by the user's hand.

In one embodiment, the trajectory should be understood as a relative trajectory with respect to the body surface. Preferably, the displacement of the optical device along its trajectory is continuous, that is the displacement relative to the human body does not mark a pause. The relative displacement of the optical device relative to the human body is never null along said trajectory. In this embodiment, two successive images are taken from two different positions. The two images acquired sharing an coverage rate overlap so as to share a common portion of the image as subsequently detailed.

In one embodiment, the displacement of the optical device along a predetermined trajectory comprises a step of acquiring a point cloud representing the surface of the subject's skin, a step of continuously updating said point cloud according to changes in the three-dimensional geometry of said surface due to the action of muscles or body movement, and optionally, continuously updating said trajectory based on the point cloud updated.
Control Law The device of the invention comprises an electronic controller for controlling the variable focus device 40. A benefit of implementing a control law Lc is to vary focal distance at each image acquisition in the vicinity of a point $P_1$ of a trajectory 30 of the body surface while guiding the image capturing device 20 along a trajectory to be traveled 32.

According to a first embodiment, the control law Lc can be planned in advance, that is before shooting. This embodiment is possible when the body model of an individual is known and when the guiding trajectory of the image capturing device 20 is planned. In this configuration, the set of variables of the control law can be precalculated so that the set of images to be acquired can be precalculated in order to form the final composite image. This embodiment can be combined with local changes in the body position and therefore in the trajectory of the target points and therefore in the guiding trajectory of the image capturing device 20. In this case, the control law is not modified as the configuration of the system {body-image capturing device} remains unchanged.

According to a second embodiment, the control law Lc is calculated in real time from the data acquired in real time. Thus, a trajectory may be planned at the body surface, but the distance between the image capturing device 20 and the body surface is not known a priori or even the local topology of the vicinity of the target points is not known and should be discovered in real time. When the control law Lc is piloted in real time, a real-time calculation is performed to feedback control the variable focus optics and the position of the image capturing device 20 so that the set of images necessary for the reconstruction of a sharp composite image are produced.

The control law Lc can be configured such that the image capturing device 20 sweeps a set of points to acquire sharp images of a complete zone of all or part of a body surface. In order to optimize the number of images acquired and the range of focus values of the variable focus optics, the control law Lc can take account of a piece of topology data in the vicinity of a point P1 the images of which are desired to be acquired.

When the surface 12 of the body is relatively planar in the vicinity of the point $P_1$, the points in the vicinity of point P1 are in a reduced range of focus values. Within this range, the focus of the optics is piloted to acquire sharp images in proximity to the point P1. Typically, if the range of focal values allows sharp high-definition images to be acquired at a depth of field of 1 mm, the number of images to be acquired to obtain a set of sharp images in the vicinity of point P1 may be reduced. Shooting is limited to focal variation over a reduced range of focus values. Such a zone can correspond to that of a flat belly of a fit, not overweight person.

When the surface 12 of the body is relatively curved in the vicinity of point $P_1$, the points in the vicinity of point $P_1$ are in a wide range of focus values. Within this wider range than the reduced range, the focus of the optics is piloted to acquire sharp images in proximity to the point P1. In order to acquire sharp images at a greater depth of field, for example 20 mm, then the range of focus values is configured to be broadened and the number of images acquired in this zone is greater than in the previous case. Such a zone can correspond to that of a calf or an arm.

Some zones may have even greater curvature such as the elbow folded, nose, ears or toes.

The control law Lc can also have an influence on the speed of displacement of the image capturing device 20 according to the number of images to be acquired locally in the vicinity of a point $P_1$ and more generally for all points $P_1$ of a trajectory. Finally, this control law Lc can be configured a priori or in real time according to the desired coverage rate of the images acquired from the surface of the human body. The coverage rate can be a percentage value defining the proportion of the image zone covered, for example, on the edges of the images in order to reconstruct an overall image. The coverage rate can also be calculated so that it defines a statistic of the proportion of sharp images at a given accuracy factor with a given error factor.

The coverage rate can also be defined step by step between two successive acquisitions. By way of example, the coverage rate may be a percentage of the proportion of an image repeated within an image based on a previously acquired image.

One advantage of this latter configuration is to obtain a zone covered with two acquired images obtained with different focuses. In this embodiment, it is possible to reconstruct a gradient to generate a reconstructed image that will be sharp over a larger dimension than each image acquired separately.

By "coverage rate between two successive images", it is meant that two successive images partially overlap into a common portion, that is the common portions of two successive images can be superimposed with each other. The purpose of this coverage rate will thus be to use two different images to form a single continuous image comprising the common portions and the non-common portions of said acquired images. Two successive images sharing a coverage rate can be acquired with different focal distances of the optical device.

In one example, the optical device is moved along the trajectory, to a first position and then to a second position. The control law triggers the acquisition of at least one image of the point P1 from the first position and then at least one image from the second position. The first position and the second position are close enough to each other to allow partial overlapping of the successive images acquired in these two positions.

In a first embodiment, the control law generates the acquisition of a first group of images from the position and then a second group of images from the second position. In this mode, the images of the first group and the images of the second group partially overlap into a common portion as described previously. The first group of images and the second group of images each comprise a plurality of images acquired with different focal distances. One advantage is to obtain a first multifocal image and a second multifocal image from the first group of images and the second group of images, respectively.

In a second preferred embodiment, a first image is acquired from the first position and a second image is acquired from the second position. The first and second images are then acquired at different focal distances. In this embodiment, the first image and the second image share a coverage rate. Preferably, the movement of the optical device relative to is continuous. By continuous movement it is meant a movement which does not reach zero speed. In this case, each image is acquired from a different position.

In one embodiment, the coverage rate is strictly less than 100%. In other words, the two successive images only partially overlap and each comprise a common portion, but also a portion not included in the other image. Preferably, the coverage rate is strictly below 99%.

In one embodiment, the coverage rate is greater than 75% and strictly less than 100% or 99%. At least 75% of the image surface area will be shared with at least one other image. The advantage of such a coverage rate is, for each point of the body surface, to acquire a plurality of images. The advantage is to be able to acquire a plurality of images acquired with different focal distances, increasing the chances of having at least one sharp portion of said point for the construction of a sharp image from the plurality of images acquired of said surface 12 as described below. Stated differently, a point on the subject's body surface is captured by a plurality of acquired images, even when the optical device was in movement between successive acquired images.

Preferably, the focal distances of acquisition of two successive images showing a coverage rate are different from each other.

As the curvature of the zone increases, image acquisition may be accomplished faster with sampling of a larger range of the focal length of the variable focus optics, movement of the image capturing device 20 may slow down, and the coverage may be configured to be greater between two successive images.

Thus, according to an example, the control law Lc can be configured with the following variables:

The travel speed $V_d$ is selected in a speed range $[V_{dmin};$
$\quad V_{dmax}]$;

The image coverage rate $T_R$ is selected from a range of
$\quad$ image coverage rates $[T_{min}; T_{max}]$;

The focus of the variable focus optics Fv is selected from
$\quad$ a range of focuses $[F_{min}; F_{max}]$;

The topological descriptor or local shape coefficient calculated from several local topological descriptors Cf Fv is selected from a range of shape coefficients [$C_{min}$; $C_{max}$];

The distance df between the variable focus optics and the point of sight $P_1$ of the body surface 12 is selected in a range of distances [$d_{min}$; $d_{max}$].

The acquisition or delay speed between two successive acquisitions $T_A$ is selected in a range of durations [$T_{min}$; $T_{max}$].

In an example mode, the viewing angle and image size are considered predefined. However, according to other examples, image dimensions and viewing angles may vary as parameters.

According to different embodiments, one or more of these variables are used to define or set the control law Lc for acquiring the images. The control law Lc may itself be a complex control law dependent on several control laws Lc1, Lc2, etc. depending on the consideration of input variables.

For example, for a point of the trajectory comprising a plurality of target points $P_1$, it can be written that, for example, the focus is defined by a first control law Lc1 defined by a relation of the type: Fv=Lc1(df, Cf). And for a given trajectory, the delay between two acquisitions $T_A$ and the speed of displacement $V_d$ of the image capturing device 20 are controlled according to a second control law Lc2 defined by a relationship of the type: $\{V_d; T_A\}$=Lc2($T_R$, Cf}.

In one embodiment, the platform transporting the optical device is moved along a trajectory at a speed of displacement $V_d$ of between 4 cm/s and 30 cm/s.

Preferably, the optical device performs image acquisitions of the skin structure of the subject at a frequency of between 5 images per second and 200 images per second (that is a delay between two acquisitions of between 0.2 s and 5 ms) during the displacement of the optics. In one embodiment, the control law varies, between two successive acquisitions, the focal length of the variable focus optics.

The displacement of the optics coupled with the acquisition speed and the variation in focal length between two successive acquisitions advantageously allow acquisition of successive images sharing a common portion at a different focal length.

When generating a sharp image, the common portion can thus be constituted from the pixels of different images acquired according to the sharpness index of each pixel for each image acquired.

Construction of a Sharp Image

According to one embodiment, the invention comprises a step of constructing a sharp image of all or part of the surface 12 of the body 10 from the plurality of acquired images of said surface 12. This image is a composite image formed from a plurality of image portions acquired by the image capturing device 20.

In order to select the image portions or groups of pixels, or even a pixel of an image, the method according to the invention comprises a step of comparing a sharpness criterion of each pixel or each group of pixels of an image with those of another image comprising a coverage of this or these pixel(s). When a pixel with sufficient sharpness is detected, for example when the criterion value exceeds a predefined threshold, then the pixel is retained in the composite image. If no pixel has a sufficient sharpness, that is the sharpness criterion of which exceeds a certain threshold, then the sharpest pixel is selected.

In order to compare sharpness or blur of different image pixels covering a same zone, an image alignment algorithm can be used to calibrate images together and more specifically the image portions covering the same zones of the body surface.

Constructing a sharp image includes clipping the acquired images to their sharpest portions while controlling that the clipped zones not retained are included in other acquired images covering the removed part of an image. This control can be performed automatically based on the coverage rate of the images acquired and a marking of the zones covered.

The invention makes it possible to generate a sharpness map of each image in the image stack in order to select the sharpest pixels of the stack of acquired images covering a given zone. It is therefore possible to generate an image from the sharpness map(s) from which the sharpest pixels are selected.

According to one embodiment, a step of estimating sharpness is performed to generate sharp zones and remove blurred zones. In order to perform this step, a sharpness estimation algorithm can be implemented. Among the algorithms possibly usable within the invention, different solutions may be implemented such as a calculation of the average or the variance of a gradient. Another method can be implemented using machine learning from a learning function. The learning function can be of the deep learning type. According to one example, a convolutional neural network CNN can be implemented. Such an algorithm allows the generation of sharpness maps of all images to allow the sharpest pixels to be identified in a second step to generate a 3D image completely sharp or at least as sharp as possible. Such a deep learning algorithm can also be implemented to process alignment of successively acquired images. When a neural network is used in this manner, it is said to be functional in the present application insofar as it allows an intermediate function to be performed such as generating a sharpness map or a depth map or even to realign images.

Shooting successive images with a coverage rate between them improves estimation of sharpness. Finally, a priori knowledge on the one hand of the distance between the target point $P_1$ and the variable focus optics 20 and on the other hand of the focal length also makes it possible to make a proper estimation of the sharpness since there are reference zones that can be defined as being sharp.

When the sharpest zones are identified and the images clipped along these zones, the method according to the invention comprises a step of assembling the sharp zones to construct a sharp image of the surface of all or part of the body.

The assembling step can be seen as an image portion aggregation step coming from different shots. Another way to perform an assembly is to merge coverage zones by addressing each point with the sharpest pixels and removing pixels from the most blurred of these coverage zones.

In one embodiment, the area of the body surface represented by the net image generated is greater than the area of the body surface represented by one of the acquired images having made it possible to generate said sharp image.

According to one embodiment, the assembled images may be in a two-dimensional space or in a three-dimensional space. Indeed, knowing the piece of depth information either from a body model or from an estimation during image acquisition, a 3D image can be automatically reconstructed.

The 3D image can be reconstructed following assembling during processing applied to the final aggregated image.

According to another example, an end-to-end learning algorithm can be used to generate from a stack of acquired images, corresponding to the plurality of images collected, as output a sharp image on the one hand and a depth map on the other hand. Learning such a learning function, for example of the CNN type, can be performed on the one hand from images acquired by an optics or from images generated by a calculator of a body or a body model, and on the other hand a completely sharp 3D image obtained from the set of images. An end-to-end neural network is referred to designate a neural network capable of directly generating an output 3D sharp image at any point.

Each of the images of the image stack acquired passing through the sharpness map is then implicit in implementing such an end-to-end algorithm. According to one embodiment, the latter algorithm can be trained on synthetic data.

There are as input the images of the stack of the zone close to point $P_1$ acquired and as output a composite image of this same zone and the depth map. A convolutional neural network CNN can for example be implemented.

The set of learning data makes it possible to train the neural network to obtain a learning function configured or learned with weighting coefficients. In this case, the fully sharp 3D image can be calculated from another algorithm in order to supervise learning of the neural network. Such learning can also lead to the generation of a depthmap.

The neural network used, whether functional or end-to-end, can be configured in different ways.

According to one embodiment, the configuration of the neural network CNN may comprise:

Convolutions or neural network layers comprising a plurality of multiplications of matrices comprising weighting coefficients obtained from a learning method, non-linear operations.

According to one embodiment, the configuration of the neural network CNN comprises as inputs images acquired by the optics.

The neural network CNN may comprise convolutions in its first layers and then fully connected neural layers at the end of the model. In the latter case, these are neurons connected to the set of neurons in the previous layer and connected to all those in the next layer.

The convolution layers may comprise a scan of an input matrix producing a series of matrix calculations. The other layers of the neural network typically comprise matrix calculations on the size of the input matrix.

In one example, each convolution comprises a matrix product between an input matrix and a weight matrix and the inclusion of an additional bias.

The application of successive layer processing within the neural network CNN comprises the application of a series of matrix multiplications which are followed by a non-linear function to produce an output of said layer. The succession of these operations defines the depth of the neural network.

According to one example embodiment, the neural network is a multilayer perceptron, known as MLP. According to an example, the neural network may be an MLP-equivalent network.

One advantage of the invention is also to reconstruct a relative depth map of all or part of the body. By "relative depth map", it is meant a map where each point in the image, for example each pixel, can be positioned in relation to another point in the reconstructed image. One of the advantages of this characteristic is that it is possible to eliminate the perspective or distortion effects of the images related to the viewing angle or the optics itself. Another advantage of this method is to obtain an accurate estimation of the local geometry of the imaged surface. This allows increasing and refining the 3D body model when the latter body model is available at system input. This estimated depth information can have a resolution of between 500 um and 1 cm. The input body model can then be refined in order to define a high resolution 3D body model.

Platforms

According to one exemplary embodiment, the image capturing device 20 is mounted to a mobile platform. According to a first embodiment, the mobile platform may be arranged at the end of a mobile robotic arm in space and including a plurality of degrees of freedom. According to a second embodiment, the platform is a drone controlled by a wireless remote control.

According to another embodiment, the platform is a manual gun comprising a distal tip on which the image capturing device 20 and in particular the variable focus optics are arranged. The gun also includes a handle for the examiner to grip, for example at the proximal end of the gun.

In another mode, the device is fixed and the patient is rotated by means of a turntable or vice versa. The invention is concerned with any type of dynamic mobile platform comprising a distal tip on which the variable focus optics is arranged.

In one embodiment, the mobile platform comprises a rail or a guide means along a predefined trajectory and the optical device is movably mounted to said rail or guide means between two positions. Preferably, the invention further comprises a cabin comprising a location for receiving a subject, especially a human subject and said mobile platform. The cabin may comprise at least one rail to provide the mobile platform with a curved trajectory around said subject placed in said location. In one embodiment, the rail is translationally movable. In another embodiment, the cabin comprises a plurality of rails and a plurality of platforms to make images of the skin of said subject.

Use of a Simple Photographic Sensor

The variable focus optics include a photographic sensor. The latter photographic sensor comprises a photosensitive electronic component and is used to convert electromagnetic radiation passing through the variable focus optics into an analog or digital signal. According to the embodiments, the photographic sensor may integrate different components making it possible to filter or amplify the signal converted.

According to one example, a CMOS ("Complementary Metal-Oxide-Semiconductor") sensor, can be used. According to another example, a CCD ("charge coupled device") sensor, that is a charge transfer device, may be used. An important advantage of the invention is that it does not require a specific hardware sensor having to implement a hardware configuration that is structurally difficult to implement or costly from a hardware architecture point of view. In other words, a CMOS or CCD photographic sensor is sufficient to obtain sharp images in a very short time, with operations that can be performed in real time.

According to one embodiment, a single calculation unit, such as a single processor, addressing the set of pixels of the sensor is implemented. The processor is thus coupled to a physical memory. Implementing a single pair of {processor, memory} allows simplified implementation of software processing which processes the images acquired.

In order to simplify software calculations, the set of pixels of the acquired image are considered independently and are processed as one unit within the same set of pixels. One advantage of the invention is not to have to process subsets of pixels to be addressed and physically associated with an electronic equipment dedicated to the subset such as a processor or a memory.

Thus, the invention makes it possible to obtain a sharp image at any point of a volume, such as a human body, and makes it possible to obtain a piece of depth information in real time at a high rate with market components such as a CMOS or CCD sensor not requiring the implementation of a complex electronic architecture.

The invention can be implemented with a simple photographic sensor due to the following different possibilities making it possible to achieve rapid calculation times:

the range of values of the focal distance variation may be reduced due to a priori knowledge of a pre-generated body model making it possible to locally know the curvature of the volume from which the images are acquired and/or, the distance between the volume and the optics can be measured by a means such as a laser to estimate the distance between on the one hand the optics and on the other hand the acquired volume, which makes it possible to perform variation in the circumscribed focal length at a reduced range of values.

Thus, based on a priori knowledge, that is the body model, or a piece of information calculated in real time, that is the distance between the optics and the surface, the invention makes it possible to obtain depth and sharpness data in a small range of values. This possibility makes it possible to reconstitute the three-dimensional envelope and the sharp images of each point of this envelope with a high real-time acquisition performance.

Learning of a Neural Network and Classification from Sharp Images

The invention also includes the implementation of a neural network classifying sharp images of singularity of an individual's skin. According to another mode, the invention includes a detection step or an image segmentation step or a regression step or even a step of generating a new image. A step of generating a new image may be performed by modifying resolution of said image, improving all or part of the image by a given processing, transformation of the image for example by changing its dimensions or colorimetry, its sharpness, or any other color parameter, or even a step of increasing, for example, the scale of the image or only part of the image. Different analysis tasks can thus be performed from the sharp images produced by the method according to the invention.

To this end, all or part of an individual's body volume is scanned by a variable focus optics. This operation can be performed, for example, from a robot arm that automatically moves around a human body in order to travel a guiding trajectory. The images are acquired and processed according to the method of the invention in order to collect a set of sharp images of a patient's body. Machine learning can be performed from photos of singularities of the skin, such as moles, scars, melanomas, carcinomas, freckles, etc.

One advantage of the invention is to make it possible to train a neural network with sharp images at any point in order to obtain very good classification performance due to the maximum resolution achieved by the sharp images.

The invention therefore relates to a method for training a neural network from sharp images obtained by the acquisition method of the invention. The training method is characterized by the input data of the neural network which are images obtained by the method of the invention. The method applies, for example, to a CNN type convolutional neural network and to any other type of neural network, in particular those previously described in this description. According to one embodiment, a "transformer" type network used alone or in combination with one or more CNN type convolutional neural network(s). Such a network especially allows importance of each part of the input data to be weighted differently.

Training can conventionally use image labels for classifying different singularities visible on the images or perform any other analysis task previously listed.

Furthermore, the invention relates to a method for classifying sharp images as a function of labels. Such a classification method can be applied to the set of images acquired by the method according to the invention of an individual's body.

Thus, the images may be represented according to a pool of images of the same label with a mention of the limb of the human body with which the image is concerned or an indication of a position on the human body or a body model. For example, the invention can represent different zoom scales of a zone of interest of a singularity so that a user can appreciate high resolution of the image of a given singularity next to a wider image of the body part from which the photo is extracted.

The invention claimed is:

1. A method for acquiring images of a first surface of a human body using an image capturing device comprising a variable focus optics, said method comprising:

acquiring a plurality of images using the image capturing device along a processing trajectory on the surface of a human body;

successively acquired images comprising among themselves a coverage rate of a portion of the surface of the human body; said acquisitions being made in a plurality of positions with respect to the surface of the human body and by varying a focal length of the variable focus optics according to a control law taking account of a measured or estimated distance between the variable focus optics and a first point of the processing trajectory, and constructing a sharp image of a portion of the surface of the human body from the plurality of images acquired of said surface including at least two images successively acquired by the image capturing device in two different acquisition positions with respect to the surface of the human body and comprising a coverage rate among them.

2. The method according to claim 1, wherein the acquiring comprises a first acquisition of a first group of images by varying the focal length of the variable focus optics into a first position and a second acquisition of a second group of images by varying the focal length of the variable focus optics into a second position different from the first position; the images of the first group of images sharing a coverage rate with the images of the second group of images.

3. The method according to claim 1, wherein the at least two images successively acquired in two different acquisition positions are each acquired with a focal length of the variable focus optics.

4. The method according to claim 3, wherein at least two successive images are acquired by varying the position and focal length of the variable focus optics.

5. The method according to claim 1, wherein constructing a sharp image of a portion of the surface of the body comprises:

clipping images of the plurality of successive images from a piece of estimated sharpness information to generate sharp zones and blurred zones;

assembling the sharp zones of said images to construct the sharp image of the surface of the body portion.

6. The method according to claim 1 further comprising measuring or estimating a distance between the variable focus optics and a first point of the surface of the body, the control law taking account of said distance measured or estimated between the variable focus optics and the first point to modify focal length of the variable focus optics between at least two images acquired in the vicinity of the point of the surface of the body.

7. The method according to claim 6, wherein the measuring or estimating of the distance between the variable focus optics and a first point of the surface of the body is carried out:

by measuring distance per point and/or;

by measuring distance combined with a known piece of topological information of the body model of the body surface and/or;

by a known piece of topological information of the body model of the body surface and a piece of position information of the optics with respect to the 3D model and/or;

by measuring distance combined with measuring local geometry of the imaged zone of the body surface and/or, by measuring local geometry of the imaged zone of the body surface and a piece of position information of the optics with respect to the 3D model.

8. The method according to claim 7, wherein calculating the distance between the variable focus optics and a first point of the body surface is performed either by measuring or by estimating:

using a distance measuring means;

from a piece of sharpness information of all images acquired and an algorithm for estimating blur and/or sharpness.

9. The method according to claim 8, said method further comprising the steps of:

receiving a 3D model of at least one part of a body, said 3D modeling at least one first surface of said body;

retrieving local topological data of the vicinity of at least the first point, said local topological data being extracted from the 3D model or calculated from the 3D model;

acquiring a plurality of images being performed by varying the focal length of the variable focus optics according to a control law further taking account of the local topological data of the vicinity of the first point of the first surface.

10. The image method according to claim 9, said method further comprising:

generating a processing trajectory at the surface of the 3D model by means of a calculator, said processing trajectory comprising at least two points at the surface of the 3D model;

constructing a sharp image of a portion of the body surface in the vicinity of the treatment trajectory.

11. An image capturing device comprising a variable focus optics for acquiring a plurality of images of the surface of a body of an individual using the image capturing device said acquisitions being made by varying a focal length of the variable focus optics according to a control law, said device comprising at least one calculator configured to implement the steps of the method according to claim 1.

12. The image capturing device according to claim 10, comprising means for measuring a distance between the variable focus optics and a first point of the surface of the body, said acquisitions being carried out by varying the focal length of the variable focus optics according to a control law taking account of the distance between the variable focus optics and the first point.

13. A mobile platform comprising an image capturing device according to claim 11, said mobile platform comprising a control interface to receive guidance instructions calculated from the body model calculated in real time.

* * * * *